United States Patent [19]

Smith

[11] Patent Number: 5,768,170

[45] Date of Patent: Jun. 16, 1998

[54] METHOD AND APPARATUS FOR PERFORMING MICROPROCESSOR INTEGER DIVISION OPERATIONS USING FLOATING POINT HARDWARE

[75] Inventor: Roger A. Smith, Austin, Tex.

[73] Assignee: Motorola Inc., Schaumburg, Ill.

[21] Appl. No.: 685,995

[22] Filed: Jul. 25, 1996

[51] Int. Cl.$^6$ .................................................. G06F 7/44
[52] U.S. Cl. .................................................. 364/748.1
[58] Field of Search ............................... 364/748.1, 761

[56] References Cited

U.S. PATENT DOCUMENTS

5,249,149  9/1993  Cocanougher et al. ............ 364/748.1
5,309,353  5/1994  Kuroiwa ............................. 364/748.1
5,563,818  10/1996  Agarwal et al. .................. 364/748.1

Primary Examiner—Tan V. Mai
Attorney, Agent, or Firm—Bruce E. Hayden

[57] ABSTRACT

A method and apparatus for efficiently generating multiple integer quotients of integer numerators divided by a common integer denominator are implemented by multiplying a floating point approximation of the reciprocal of the integer denominator by floating point representations of the numerators, biasing the floating point quotients before rounding up or down as required. First, an initial approximation of the reciprocal of the denominator is computed (102) by squaring (114) a limited precision square root of the reciprocal (112). A final reciprocal is computed using a finite power series (104). Finally, modified numerators are formed (106) by biasing the original numerators, products of the modified numerators multiplied times the reciprocal are computed, and the products are rounded up or down as required (108).

57 Claims, 7 Drawing Sheets

| CYCLE | OPERATION | READY | COMMENT |
|---|---|---|---|
| 0 | $r = 1/\sqrt{b}$ | 3 | APPROXIMATE, 5 BITS ACCURACY |
| 1 | | | |
| 2 | | | |
| 3 | $y = r*r$ | 6 | APPROXIMATE, 4 BITS ACCURACY |
| 4 | | | |
| 5 | | | |
| 6 | $e = 1-b*y$ | 9 | |
| 7 | | | |
| 8 | | | |
| 9 | $s = e*e$ | 12 | $e^2$ |
| 10 | $n = e+e*e$ | 13 | $e(1+e)$ |
| 11 | | | |
| 12 | $q = s*s$ | 15 | $e^4$ |
| 13 | $k = y+y*s$ | 16 | $y(1+e^2)$ |
| 14 | | | |
| 15 | $d = q*q$ | 18 | $(1+e^8)$ |
| 16 | $c = n+n*q$ | 19 | $e(1+e)(1+e^4)$ |
| 17 | | | |
| 18 | $m = k*d$ | 21 | $y(1+e^2)(1+e^8)$ |
| 19 | $P = \frac{1}{2}+a$ | 22 | |
| 20 | $(Q = \frac{1}{2}-a)$ | 23 | |
| 21 | $Z = y+m*c$ | 24 | $y+ye(1+e)(1+e^2)(1+e^4)(1+e^8)$ |
| 22 | $(R = \frac{1}{2}+a'')$ | | |
| 23 | | | |
| 24 | $S = M+P*Z$ | 27 | |
| 25 | $(T = M+Q*Z)$ | 28 | |
| 26 | $(U = M+R*Z)$ | 29 | |
| 27 | $\lfloor \frac{a}{b} \rfloor = S-M$ | 30 | |
| 28 | $(\lceil \frac{a'}{b} \rceil = M-T)$ | 31 | |
| 29 | $(\lfloor \frac{a''}{b} \rfloor = U-M)$ | 32 | |

METHOD AND APPARATUS FOR PERFORMING MICROPROCESSOR INTEGER DIVISION OPERATIONS USING FLOATING POINT HARDWARE

FIELD OF THE INVENTION

This invention generally relates to microprocessor division and specifically relates to a method and apparatus for generating integer division results using hardware floating point resources which can perform floating point addition and multiplication operations.

Background of the Invention

In the modern computing industry, it is becoming increasingly necessary to perform integer divide operations using a central processing unit (CPU) within a computer system. These integer divide operations, which involve dividing an integer numerator by an integer denominator, are used for many applications. Typically, integer division is used in calculations involving MPEG sequences or JPEG images for use on the Internet. Integer division is used in computer graphics processing, various plotting algorithms, 3D screen displays, graphical user interfaces (GUIs), and other applications which may require scaling and/or compression using integer division. Multimedia applications along with linear algebra and matrix calculations require the use of integer division. Video processing, integer linear programming, multiple-precision arithmetic and the use of Euclid's greatest common denominator (GCD) algorithm also require significant numbers of integer divisions. Therefore, as these applications are being used more extensively, it becomes important for modern computers and modern microprocessors designs to perform integer division in an increasingly effective and efficient manner.

Presently, integer division is performed by using a divide operation within a central processing unit (CPU). This integer division is performed in an integer execution unit of the CPU that typically has no more than 32 bits of precision. Most divide operations require at least 20–40 clock cycles in which to operate and the divide operation is usually the most time consuming mathematical operation performed in most modern central processing units (CPUs). As is recognized in the industry, a computer that operates faster is a more valuable computer, so the use of divide operations is not optimal. In the applications discussed above, the integer division that is occurring may typically be a scaling operation which always involves the same integer denominator. When performing a divide operation, where a denominator is continually the same value, each divide must be performed serially and independent of one another and no speed advantage can be achieved by performing parallel operations or by passing information between divide operations to speed subsequent divide processing when the same integer denominator is encountered. In summary, the use of integer divide operations within integer units is an ineffective way in which to perform integer division operations to allow for the applications discussed above to be executed in a reasonable time period with reasonable efficiency. The use of integer divide operations to do integer division is slow, ineffective for clustered scaling which comprises the same integer denominator, lacking in precision, and in general an ineffective methodology for use with the above applications. At the same time, it is common practice for floating-point processors to provide efficient pipelined processing of addition, subtraction, and multiplication operations of floating-point numbers. These floating-point processors also typically can deal with 53-bit quantities.

Therefore, the need exists for a new apparatus and method for performing integer divide operations on integers represented in floating-point form where the speed of execution of these integer divide operations is improved, precision of the operation is improved, and greater pipelining of the operations are achieved while multiple divisions being performed using a same denominator can be streamlined in a more time effective manner.

DETAILED DESCRIPTION OF A PREFERRED EMBODIMENT

Generally, the present invention involves performing integer divide operations within a central processing unit (CPU) by avoiding the use of divide hardware and algorithms. Instead, the hardware and methods taught herein use the more efficient addition and multiply resources of a hardware floating point unit within a CPU to process the integer divide operations in both an accurate and speed efficient manner. In the prior art, mathematical divide operations are used to perform integer divide functions. Divide operations involve dividing an integer numerator a by an integer denominator b to give a result x where x is a/b rounded to some integer value. The floor of a/b, denoted $$\lfloor \tfrac{a}{b} \rfloor$$

is the largest integer which is not greater than a/b, while the ceiling of a/b, denoted $$\lceil \tfrac{a}{b} \rceil$$

is the smallest integer which is not less than a/b. In the methods and apparatus taught herein, the integer divide of a/b is performed by generating an approximation to 1/b $=b^{-1}$, the inverse of b, computing a biased numerator a'=± (a+p), performing a multiplication between $1/b=b^{-1}$ and a', and rounding the result of the multiplication to the next largest or next smallest integer.

It is important to note that the additional biasing of the value a discussed herein is needed when using this method, since the value of $1/b=b^{-1}$ may not be representable in the CPU to infinite or perfect precision. For example, the value of ⅓ cannot be represented with infinite/perfect accuracy in most CPUs. Therefore, when the central processing unit (CPU) receives the integer numerator a and the integer numerator b, these numbers are either provided in a floating point format or converted to a floating point format for floating point processing where a is biased to compensate for loss of accuracy in approximating the value of $1/b=b^{-1}$.

Experimentation has shown that typical integer divide operations using an integer unit may take 20–40 clock cycles for 32-bit integers. Using this method of addition and multiplication within a floating point unit, a single 50-bit integer divide operation takes 30 clock cycles. If divide operations are performed using the same integer denominator b, (i.e. italicize) then a second divide can be performed with only one additional clock cycle, and a third divide can be performed with a second additional clock cycle. Additional divides are almost as cheap. In other words, where a typical integer divide unit would calculate 24/11, 101/11, and 65/11 in roughly 60–120 clock cycles, the method of finding a rounded value of $a'b^{-1}$ as taught below can find all three integer quotient results in 32 clock cycles. Furthermore, these results are obtained in floating-point format which makes it easier to make direct use of the results in better-pipelined floating-point units. The time is faster than a single floating-point divide in the floating-point unit, and a number of additional computations may be overlapped with the floating-point operations which provide the result of the integer divide operation.

Therefore, the integer divide procedure and apparatus taught herein provides for floating point calculations which are performed in floating point hardware which are typically more effectively pipelined than integer hardware units. The speed of the division operation is significantly improved for even a single integer divide operation in a floating-point unit, and multiple divide operations which have the same denominator b (such as in JPEG scaling and the like) are greatly improved in performance. Floating point hardware units provide for more bit precision, and therefore the methods and apparatus taught herein provide correct integer division precision for integers larger than those in 32-bit representations commonly used in integer units. In addition, the integer values may be maintained in a floating point format so that conversion times between integer formats and floating point formats are reduced. In general, the method for computing integer division results taught herein allows for rapid result computation which enables multimedia applications, MPEG applications, JPEG processing, graphical interfaces, 3D graphics, greatest common denominator (GCD) calculations, linear algebra calculations, matrix operations, video processing, digital-audio processing, integer linear programming, and the like, to be performed at computational speeds not previously possible.

The invention may be further understood with reference to the theoretical discussion section and FIGS. 1–10 below.

Before illustrating the specific method and apparatus for performing integer divide operations for various computer applications, the following theoretical discussion is provided to aid in understanding of the of the integer divide process taught herein.

All integers with magnitudes less than a maximum value A are representable in a floating-point format. Let $|a|<A$ and $A>b>0$ be two integer values provided to a CPU. The floor $$\lfloor \tfrac{a}{b} \rfloor$$

and ceiling $$\lceil \tfrac{a}{b} \rceil$$

are also integers in the range (−A,A). The goal is to compute the floor or ceiling without doing an exact division by using an approximate $z \approx b^{-1}$ and computing $$\lfloor \tfrac{a}{b} \rfloor = \lfloor \left( a + \tfrac{1}{2} \right) z \rfloor$$

and/or $$\lceil \tfrac{a}{b} \rceil = \lceil \left( a - \tfrac{1}{2} \right) z \rceil.$$

This CPU computation can be performed rapidly and has all of the advantages previously discussed. The above computations will give the correct result if z is a precise enough approximation to $1/b = b^{-1}$ so that $$\delta = 1 - bz$$

satisfies $$|\delta| < \tfrac{1}{2A+1}.$$

A convenient way to compute z in a CPU is by obtaining an initial estimate of $1/b = b^{-1}$ referred to as approximation y, computing $e = 1 - by$, and finally by computing z from y by one or more iterative processing steps within the CPU. A truncated power series approximation is given by:

$$z = y(1 + e + e^2 + e^3 + e^4 + \ldots + e^m).$$

If this truncated power series approximation is computed exactly, the result will give an error $\delta = e^{m+1}$. A computation can be carried out with one use of this expression (e.g., one iteration), or with a sequence of uses (e.g., multiple iterations) depending on the number of terms used in the power series. For a pipelined processor with moderate or high latency, it is generally favorable to use a single polynomial with a higher value of m, while for a processor with low latency repeated use of a lower-order polynomial is more favorable. In addition, for certain values of m the polynomial can be factored easily, permitting much faster evaluation of a single polynomial of high order than would be otherwise be expected. Such a case, as illustrated below, is particularly favorable.

For modern pipelined microprocessors (see FIGS. 8–9), there is often an instruction which computes an approximation to the reciprocal of a floating-point number. If such an instruction gives an 8-bit result to be used as the value of approximation y, m=6 would be the smallest m which would give a z with more than 50 bits of accuracy (if computed directly). If such an instruction were fast, it would be a good starting point.

If such an instruction is slow or not present, an approximation can be obtained using an instruction which computes an approximation to the reciprocal square root of a floating-point number. If such an implementation gives an approximation to $r = 1/\sqrt{b}$ which is accurate to 5 bits, an approximation y to $1/b = b^{-1}$ can be computed as $y = r^2$ with an accuracy of somewhat less than 4 bits. It can be significantly faster to work with this result and take m=16 than to use the starting approximation described in the previous paragraph.

To use this less than 4-bit accurate value of y while ensuring proper for an A value of $2^{50}$ looks like a daunting problem. The preferred approach is to take a single polynomial with m=16. After factoring, the final approximation can be written $$z = y + ye(1+e)(1+e^2)(1+e^4)(1+e^8).$$

This factoring can be calculated in many ways by choosing the order in which the arithmetic operations are carried out.

A particularly fast and convenient one when a combined multiplication/addition instruction is available is $$z=y+(e+e^2)(y+y\cdot e)((e+e^2)+(e+e^2)\cdot e^4)(1+e^8).$$

There are still a number of ways of choosing the order so as to minimize the time needed to compute z. A particularly good one is illustrated below.

If computed exactly, this z would satisfy the required error bound on δ. However, there are necessarily a number of arithmetic roundings which take place in the computation of z as shown. The maximum total error which could be introduced depends in detail on the order in which the operations take place. With the particular choice of operations described in FIG. 7, it is somewhat tedious but straightforward to show that the final δ, taking into account both the exact discrepancy and the arithmetic rounding inaccuracies is bounded below the required value for the given choice of A. This accuracy is guaranteed for any of the four IEEE arithmetic rounding modes. Note that the multiply-add instruction which is typically hardwired in many CPU's or digital signal processors (DSP's) is very useful in implementing this polynomial evaluation efficiently and accurately. It is convenient to work in either the "round-to-0" or "round-to-negative-infinity" modes in order to do the final rounding, although it is possible to work in the "round-to-plus-infinity mode".

The final production of an integer is achieved efficiently using standard floating-point instructions by the artifice of adding a'z to a large number M, which in a round-to-minus-infinity or round-to-zero rounding mode will give the highest integer below M+a'z (the value M+a'z will never be exactly an integer) and in the round-to-plus-infinity mode will give the lowest integer above M+a'z (the value M+a'z will never be exactly an integer). By subtracting M from the result or subtracting the result from M, the correct floor or ceiling is obtained. In round-to-zero or round-to-minus-infinity mode, $$\lfloor \tfrac{a}{b} \rfloor = \left( M + \left( a + \tfrac{1}{2} \right) z \right) - M$$

$$\lceil \tfrac{a}{b} \rceil = M - \left( M + \left( \tfrac{1}{2} - a \right) z \right),$$

while in round-to-plus-infinity mode, $$\lfloor \tfrac{a}{b} \rfloor = M - \left( M + \left( -a - \tfrac{1}{2} \right) z \right)$$

$$\lceil \tfrac{a}{b} \rceil = \left( M + \left( a - \tfrac{1}{2} \right) z \right) - M.$$

With these methods, on modern pipelined CPUs (see FIG. 9) it is possible to compute correct floors and ceilings of ratios of integers a and b less than or equal to $2^{50}$ with all of the advantages over the prior art as previously discussed herein. Note that the same value of z can be used for all fractions with the same denominator b. Note also that for such integers, the result of biasing a is exactly representable in double precision. In general, if one wishes to deal with N-bit integers exactly, a small number of extra bits is needed in the floating-point arithmetic to encompass the arithmetic roundings occurring during the computation of z.

The invention can be further understood with specific reference to FIGS. 1–10.

Figure 1:
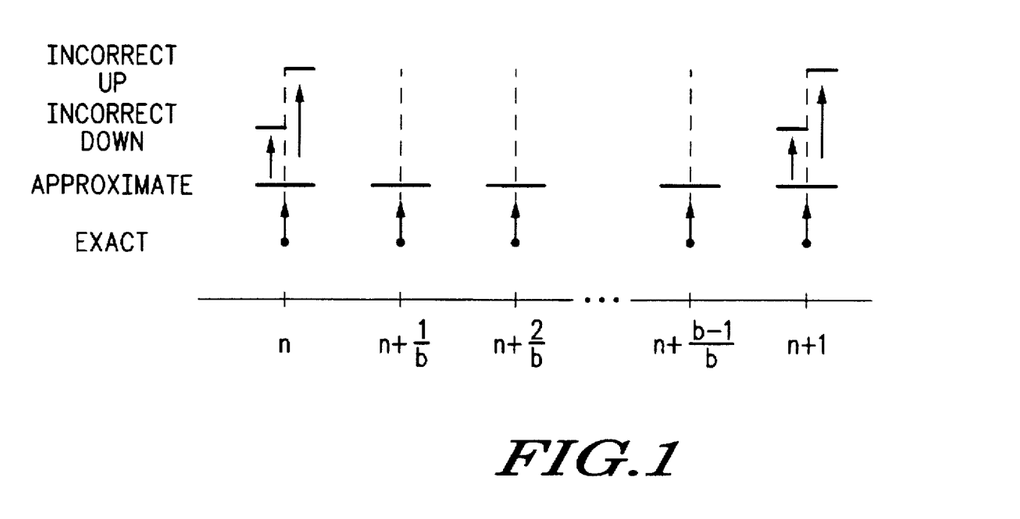
FIG. 1 is a number line illustrating one of the problems addressed by this invention.

FIG. 1 is a number line that illustrates one of the problems addressed by this invention. The ticks on the number line show possible values of the rational result of integer division of an integer by an integer b. These results are an integer n plus a multiple of 1/b. Between two consecutive integers n and n+1, the possible values are $$n, n+\tfrac{1}{b}, n+\tfrac{2}{b},$$

and so on up to $$n+\tfrac{b-1}{b}$$

and finally n+1. Above the number line are shown the exact possible rational results. If these results were computed only approximately, such as by multiplying by an approximate reciprocal instead of dividing by the exact denominator, they would be spread out in some distribution about these exact points. The short line segments above the dots indicate the maximum range of this spread. If the approximate result were in one of the lower half-segments above the full segments, a subsequent truncation would lead to the wrong floor result. For example, anything to the left of the n line would be truncated to n−1 although the actual floor is n. If the approximate result were in one of the upper half-segments above the full segments, a subsequent rounding would lead to the wrong ceiling result. For example, on the half-segment to the right of the n line, a ceiling would give n+1 instead of the correct result n.

Figure 2:
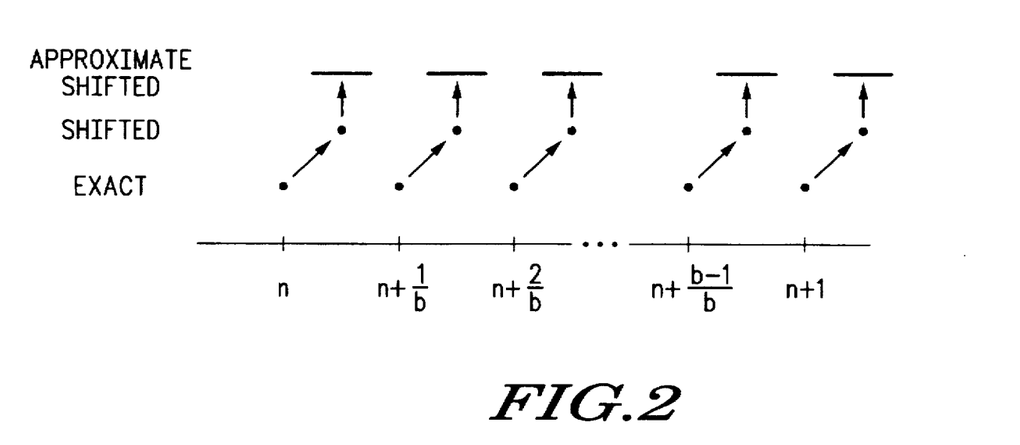
FIG. 2 is a number line illustrating this invention.

FIG. 2 is a number line illustrating the invention. The ticks on the number line show possible values of the rational result of integer division of an integer by an integer b, as before. Above the number line are shown the exact possible rational results of dividing an integer plus 1/2 by b. These results are biased by an amount 1/2b with respect to those in FIG. 1. The short line segments above the exact biased solutions illustrate the spread of uncertainties associated with approximations to the exact reciprocals. If the shift is to the right as shown and the spread is less than 1/2b, the approximate biased result can always be rounded down to the next lowest integer to get the exact value $$\lfloor \tfrac{a}{b} \rfloor,$$

while if the shift is to the left (not shown) and the spread is less than 1/2b the approximate biased result can always be rounded up to the next integer to obtain the exact value $$\lceil \tfrac{a}{b} \rceil.$$

There are therefore no values of a for which the computation can fail. The shift, combined with an efficient means of producing a sufficiently accurate approximation to 1/b, are the keys to this invention.

Note here that FIG. 2 illustrates shifting up which, combined with rounding down, is used to generate the floor function. A shift down, combined with rounding up, would generate the ceiling function. Various identities, such as $\lceil x \rceil = -\lfloor -x \rfloor$ can be used to provide slight variants of the illustrated method.

Figure 3:
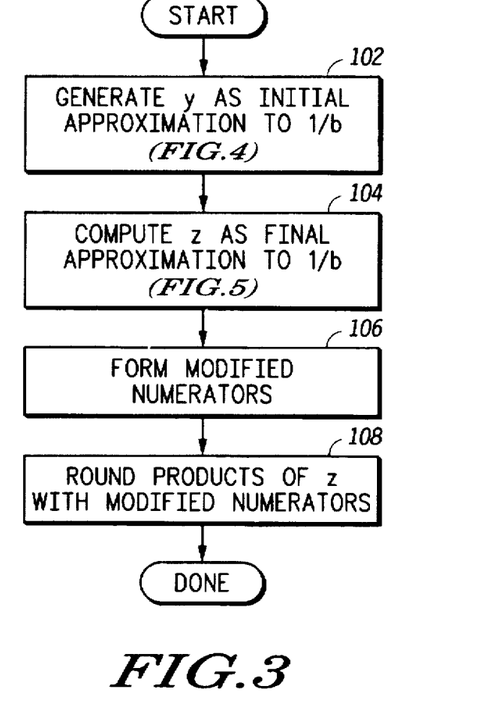
FIG. 3 is a high level flowchart illustrating operation of this invention.

FIG. 3 is a high level flowchart illustrating the invention. First y is generated as an initial approximation to 1/b, step 102. Next, z is computed as a final approximation to 1/b, step 104. Modified numerators are then formed in step 106. Finally, products of z with the modified numerators are rounded in step 108.

Figure 4:
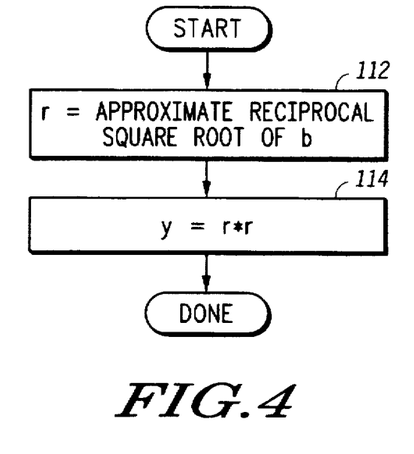
FIGS. 4 through 6 are flow charts illustrating the steps in FIG. 3.

FIG. 4 is a flowchart that illustrates step 102. First r is computed as an approximate reciprocal of 1/√b in step 112. Next y is computed as $r^2$ in step 114.

Figure 5:
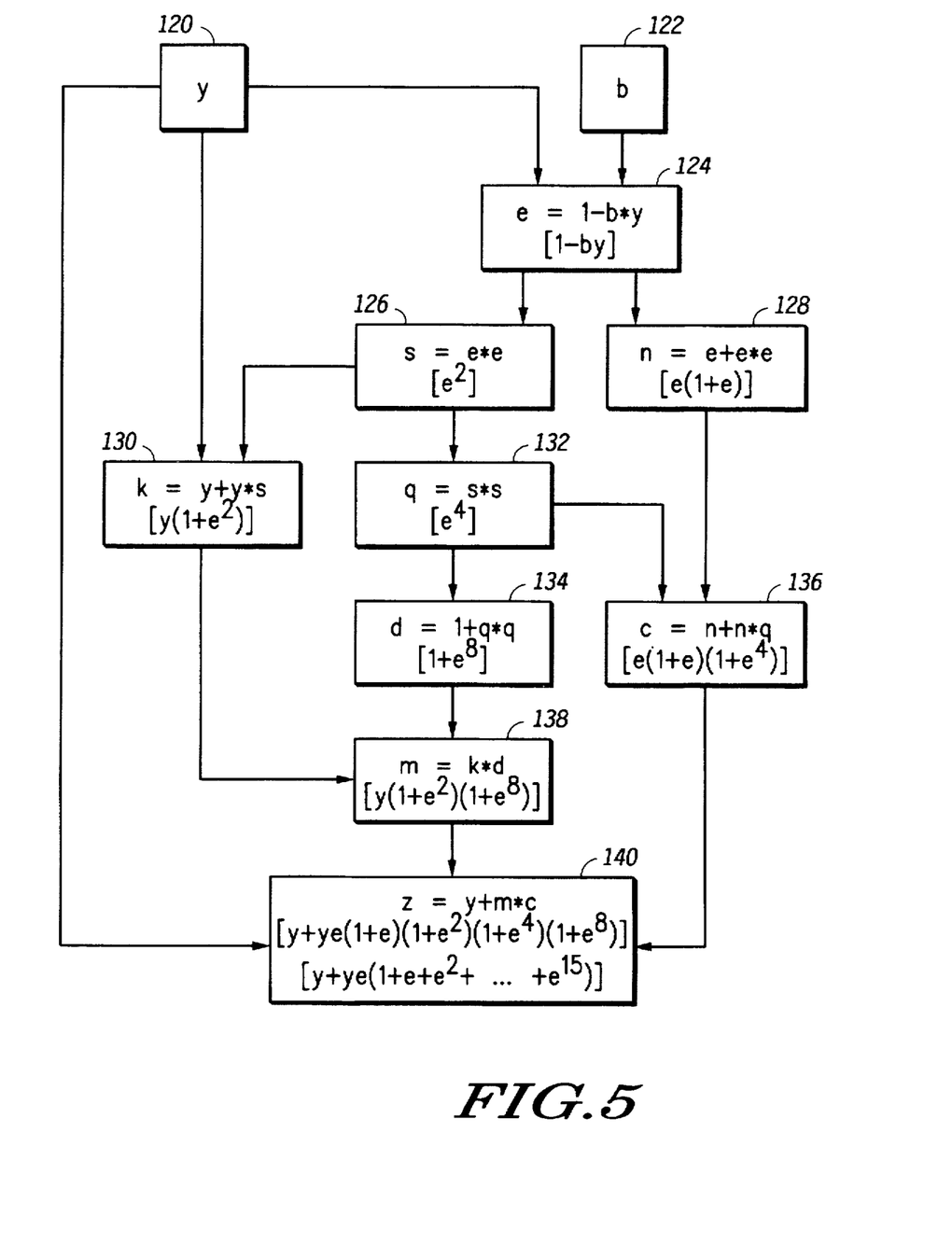

FIG. 5 is a flowchart that illustrates the computation of z as the final approximation to 1/b in step 104. The two input values in FIG. 5 are y in box 120 and b in box 122. The y value in box 120 was computed in step 114 and FIG. 4. The b input value in box 122 is the denominator. A value e is computed to be e=1–b*y=(1–by) in step 124. In this and subsequent equalities, the middle term represents an operation to be performed and the right-hand term represents the algebraic exact value that would be obtained with exact arithmetic. This value e is used to compute s=e*e=e$^2$ in step 126 and n=e+e*e=e(1+e) instep 128.

The value s from step 126 is used in the computation of k=y+y*s=y(1+e$^2$) in step 130. The s value from step 126 is also used in the computation of q=s*s=e$^4$ in step 132. The value of q from step 132 is used in the computation of d=1+q*q=1+e$^8$ in step 134. The values of q from step 132 and n from step 128 are used in the computation of c=n+n*q=e(1+e)(1+e$^4$) in step 136. Values of k from step 130 and d from step 134 are used in the computation of m=k*d=y(1+e$^2$)(1+e$^8$) in step 138. Finally the values of y from box 120, m from step 138, and c from step 136 are used in the computation of z=y+m*c=y+ye(1+e)(1+e$^2$)(1+e$^4$)(1+e$^8$) in step 140. The exact result is equivalent to y(1+e+e$^2$+...+e$^{16}$), which is sufficiently accurate for the illustrated implementation.

Figure 6:
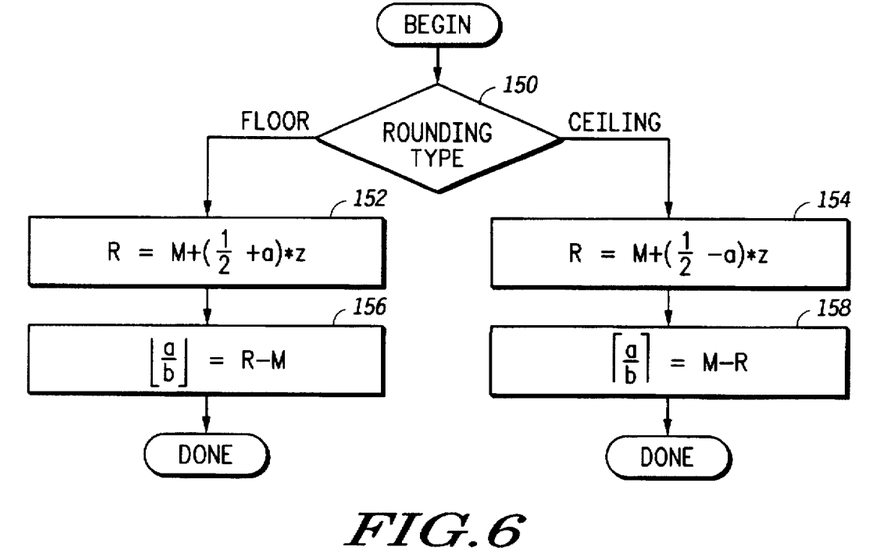

FIG. 6 is a flowchart illustrating steps 106 and 108 in FIG. 3. A test is made of the rounding type (floor or ceiling function) in step 150. If the rounding type indicates a floor function, the value of R is computed as R=M+(1/2+a)*z in step 152. The result $$\lfloor \frac{a}{b} \rfloor$$

is computed by subtracting M from R, in step 156. If a ceiling rounding is indicated in step 150, R is computed to be $$R = M + \left( \frac{1}{2} - a \right) * z$$

in step 154. The result $$\lceil \frac{a}{b} \rceil$$

is computed by subtracting R from M in step 158. The method illustrated for doing the rounding assumes that floating-point arithmetic is being performed in round-to-zero or round-to-minus-infinity mode. Alternative means were discussed previously.

Figure 7:
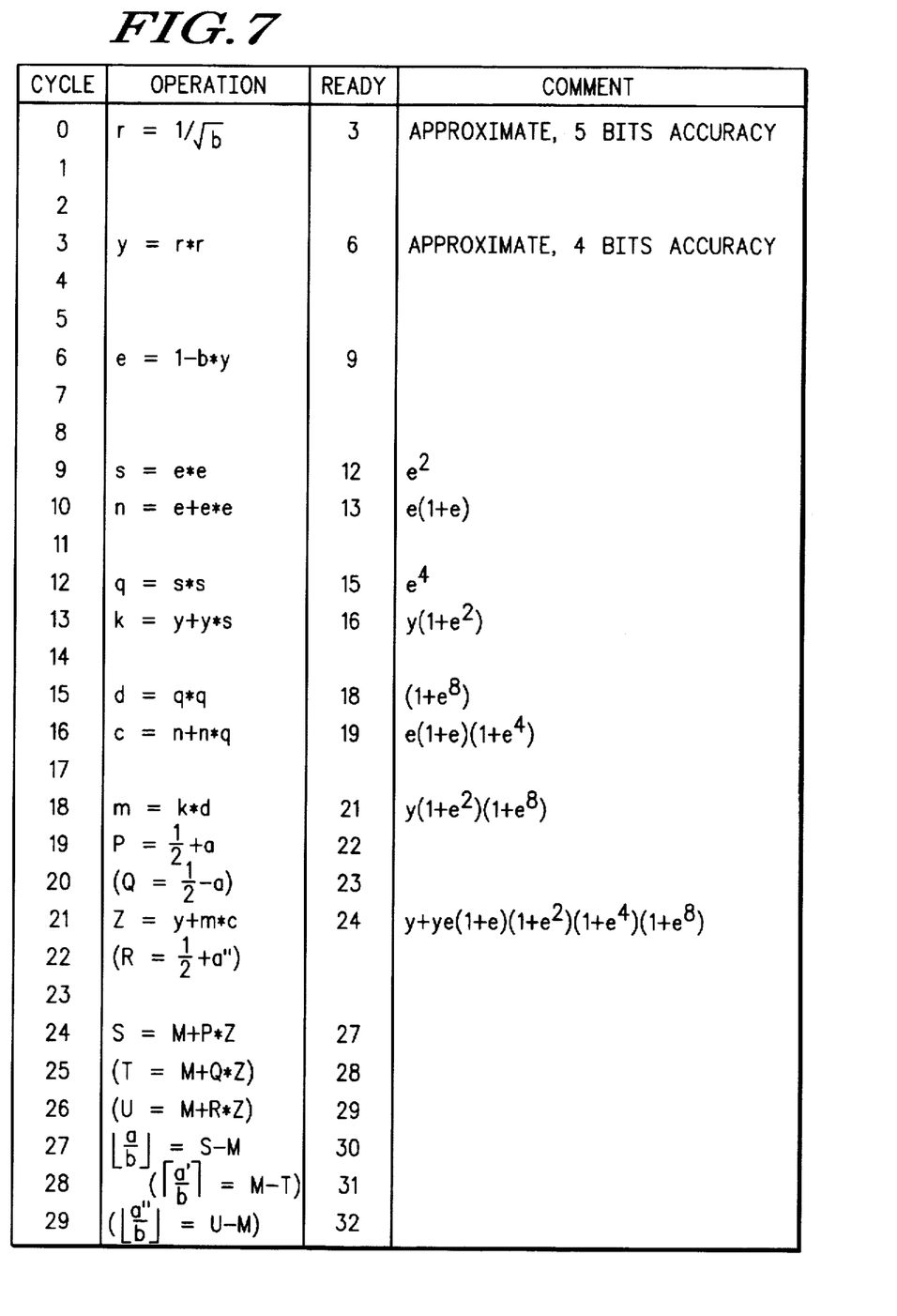
FIG. 7 an instruction scheduling table illustrating operation of this invention in a pipelined processor system.

FIG. 7 is an instruction scheduling table indicating execution of a pipelined CPU implementing the invention. The table has four columns. Column 1 contains the cycle number. Column 2 contains the operation. The schedule illustrated computes $$\frac{a}{b}, \frac{a'}{b}, \text{ and } \frac{a''}{b}.$$

Note that cycles 20, 25, and 28 are the only additional cycles needed to compute $$\frac{a'}{b}$$

and that cycles 22, 26, and 29 are the only additional cycles needed to compute $$\frac{a''}{b}.$$

The third column indicates when the cycle at which the result of an operation indicated in the second column is available for subsequent operations. The scheduling assumes single issue per clock and a three-clock latency for all instructions. In cycle 0, r is computed to be $$r = \frac{1}{\sqrt{b}}.$$

The result of that computation is available in cycle 3. Then in cycle 3, y is computed to be y=r*r. The result of this computation is ready in cycle 6, where it is used to compute e=1–b*y. Pipelining becomes apparent in cycles 9 and 10, where the value e is used to compute the value of sin cycle 9 and the value of n in cycle 10. Finally the fourth column contains comments describing the result of some of the operations. This schedule performs the computations described in FIG. 5. Note that the result $$\frac{a}{b}$$

is available at cycle 30, the result $$\frac{a'}{b}$$

is available at cycle 31, and the result $$\frac{a''}{b}$$

is available at cycle 32. In addition to achieving three results in 32 cycles, an additional 10 floating-point operations could have been initiated and completed at no extra time cost. If only $$\frac{a}{b}$$

had been computed, 16 additional floating-point operations could have been carried out in the first 30 cycles, while if both $$\frac{a}{b} \text{ and } \frac{a'}{b}$$

had been computed, 14 additional floating-point operations could have been carried out in the first 31 cycles. These speeds are typically faster than a single floating-point double-precision division would be on such a processor. In addition, it is common for a division operation to prevent the issue of other floating-point instructions.

Figure 8:
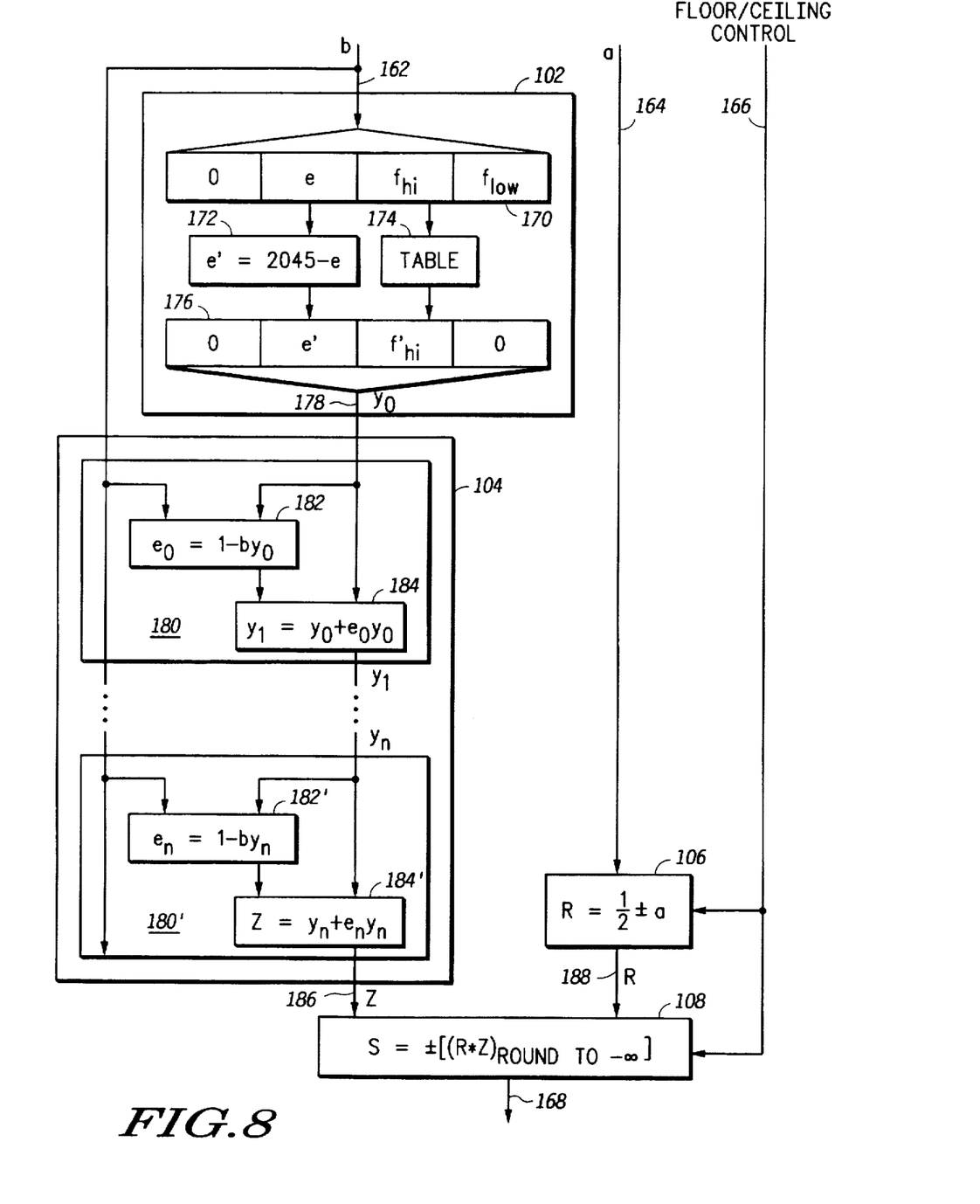
FIG. 8 is a block diagram illustrating a custom design integrated circuit implementation of this invention.

FIG. 8 illustrates a custom-designed integrated circuit which can be used to perform the operations taught in the FIGS. 1–7. FIG. 8 illustrates hardware which is used to perform the steps 102 through 108 as clearly labeled in FIG. 8. In other words, the hardware block 102 in FIG. 8 is used to perform the step 102 in FIG. 3. The hardware block 104 in FIG. 8 is used to perform the step 104 in FIG. 3. Hardware block 106 is used to perform the step 106 from FIG. 3. Hardware portion 108 of FIG. 8 is used to perform the step 108 of FIG. 3.

In FIG. 8, the input integer numerator a and the integer denominator b are provided via conductive lines 162 and 164, while a signal controlling whether a floor or ceiling operation is desired is provided via conductive lines 166.

Hardware portion 102 indicates hardware which can be used to provide an initial approximation y of the inverse of the input value b. The value of b is illustrated in a floating point format 170. Format 170 has an exponent portion e and a fractional portion containing high order bits labeled as $f_{high}$, low order bytes labeled as $f_{low}$. The exponent portion e is used to construct an exponent portion of $y_0$, wherein $y_0$ is an initial approximation of the inverse value of b. The $f_{high}$ portion of the fractional part of format 170 is used to access a table stored in memory. The table 174 stored in memory is typically provided in either ROM memory or RAM memory. The table will provide high order bits of a fractional portion $f_{high}$ of $y_0$, while the bottom portion of the fractional portion is filled in with 0's as illustrated via format 176 in FIG. 8. The format 176 illustrates the exponent and fractional portions of the value $y_0$, which is an initial approximation of the inverse of the input b provided via conductors 162. This value of $y_0$ is provided via a conductor 178 to the next part of the hardware.

The $y_0$ value is iteratively processed or pipeline processed via a hardware section 104 to result in the final approximation of 1/b accurate to within a specified tolerance. The hardware portion 104 accepts as its input the value $y_0$ via conductor 178 and the value b via conductors 162. Once these input values have been provided by conductors 162 and 178, either a single hardware unit will iteratively perform progressive calculations of a more accurate inverse approximation, or a pipelined set of multiple hardware units will calculate in a sequential pipelined operation a more precise approximation of the inverse of the value b. The particular implementation illustrated utilizes simple formulas which can be easily pipelined. If the stages share hardware, the earlier ones can use lower-precision arithmetic than the later ones. If the stages utilize the same hardware iteratively, power can be reduced in earlier stages by carrying out only part of the calculation.

A more precise approximation of the inverse of b is performed as illustrated in hardware diagram 104. In a first stage of a pipeline or in a first iterative step, hardware 180 is used to calculate an error term via hardware 182. Using the error term and the value of $y_0$, a more accurate inverse approximation of b is calculated via hardware 184. Using iterative processing or pipeline processing as illustrated via subsequent steps or stages 180', similar operations to that illustrated in 180 are performed to further the precision of the inverse approximation of the value b. Once enough iterations or enough stages of the pipeline located within hardware 104 have been executed so that a specified precision tolerance is attained, an output z is provided via a conductor 186. In parallel to the hardware portions 102 and 104, the input integer numerator value a is processed via hardware 106. Hardware portions 106 and 108 receive floor and ceiling control information via conductors 166. The signal on line 166 is used to control whether a floor or ceiling operation will be performed. In step 106, this control is used to determine how the a value is biased (+ for floor and − for ceiling). The biased value R is provided via conductors 188 to hardware 108. Hardware 108 then performs a multiplication operation between the value z provided via conductors 186 and the value R provided via conductors 188. The product of the multiplication is then rounded to the next lowest integer. The control signal from conductors 166 determines whether to change the sign of that integer (no for floor, yes for ceiling).The output of hardware 108 is an integer quotient result value provided via conductors 168. The partitioning of FIG. 8 according to the structure of FIG. 3 makes it simple to retain the z value if the b value does not change, or to obtain the z value from a cache if the b value was recently used. As discussed previously, mathematical identities could be used to provide identical functionality with minor changes to the implementation.

Figure 9:
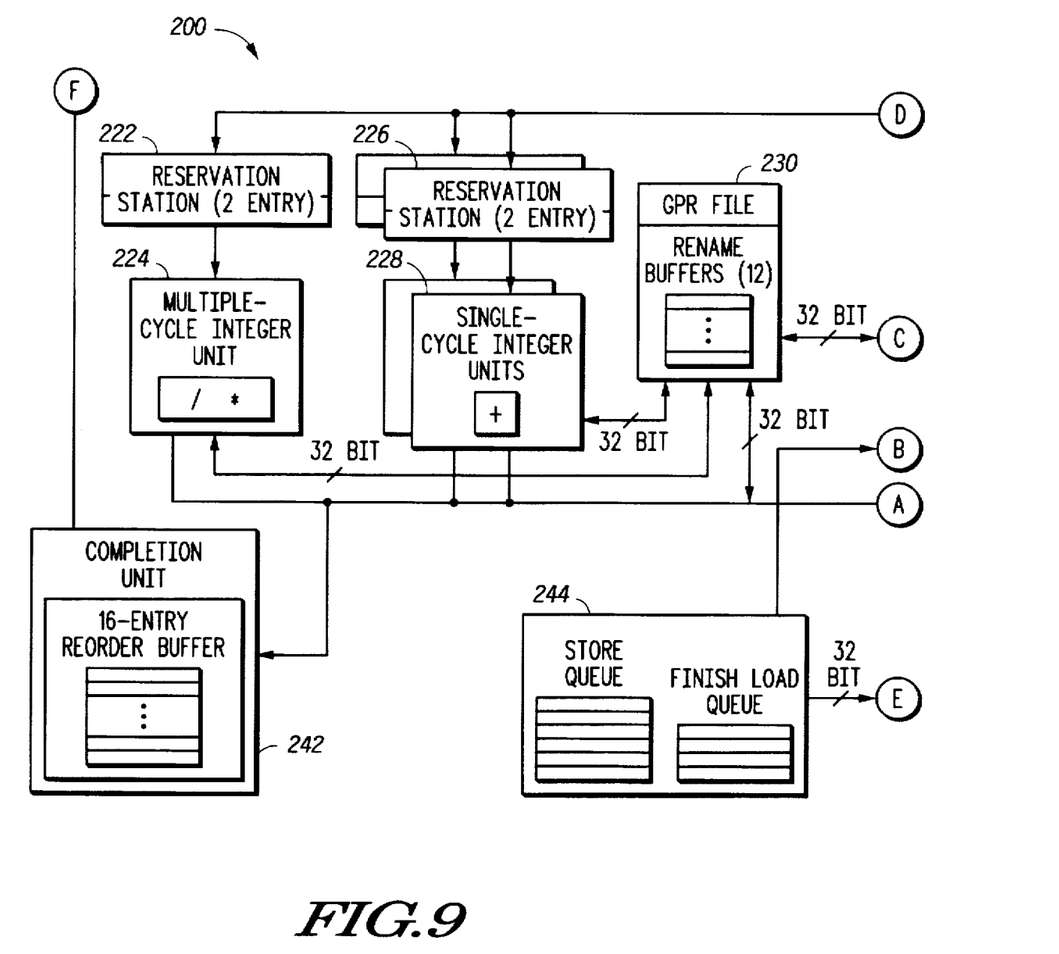
FIGS. 9 and 10 together are a block diagram illustrating a data processing system implementing this invention.
Figure 10:
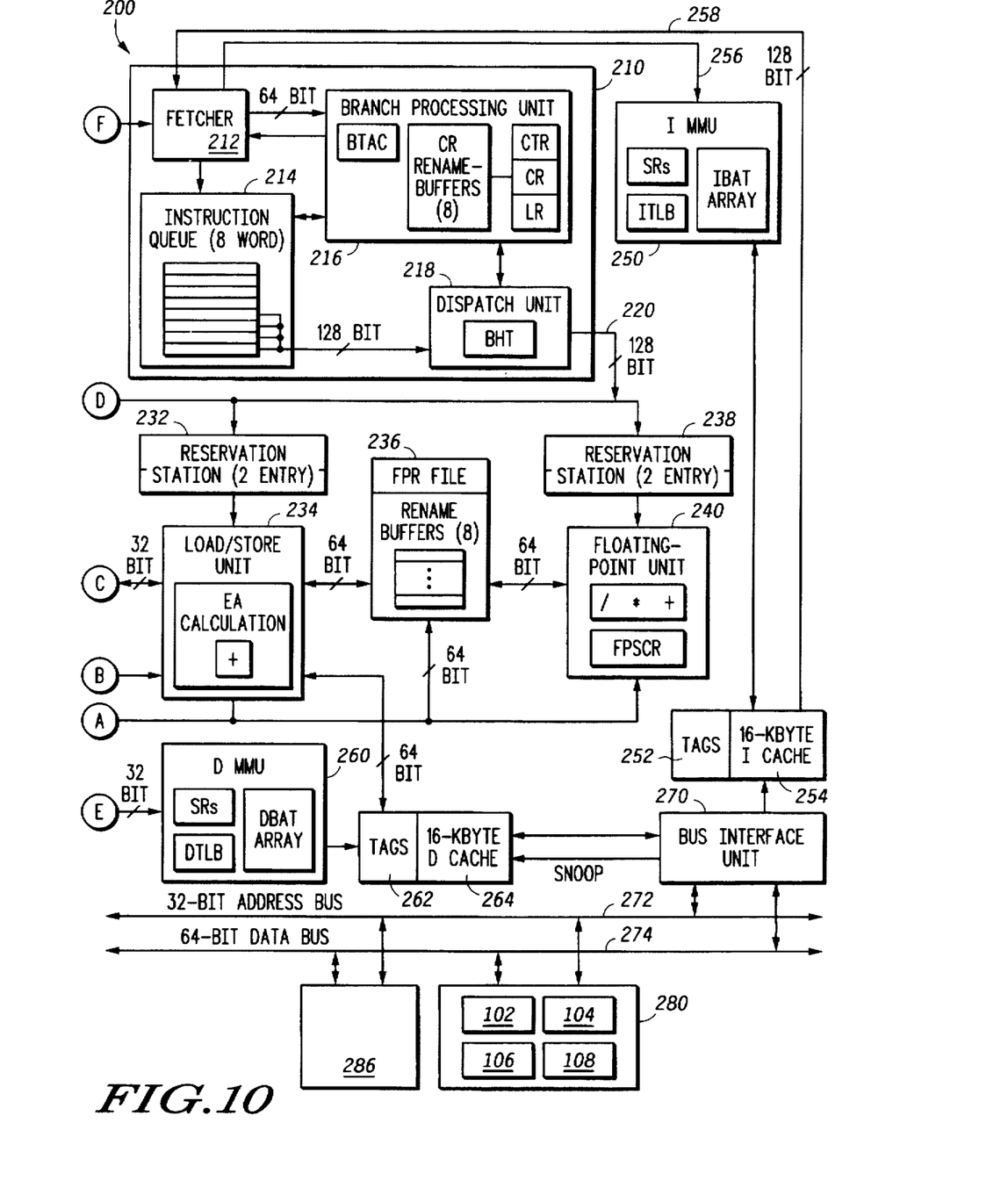

FIGS. 9 and 10 together illustrate a data processing system which can be used to perform integer divide operations as taught herein. FIGS. 9 and 10 illustrate a central processing unit (CPU) portion 200 which is coupled via a 32 bit address bus 272 and a 64 bit data bus 274 to external memory 280. The central processing unit (CPU) 200 has a fetch unit 212. The fetch unit 212 is responsible for fetching computer instructions from the 16 kilobit I (Instruction) cache 254 via the 128 bit bus 258 making use of the instruction memory management unit (IMMU) 250. The fetch unit 212 provides instructions which fill an 8 instruction queue 214 as illustrated in FIG. 10. The fetch unit 212 continues to fetch as many as four instructions at a time to ensure that the queue 214 is continually filled with instructions which can be processed by the CPU portion 200. A branch processing unit 216 which contains branch prediction information is used to control the fetcher 212 so that the proper execution flow of instructions is maintained within the instruction queue 214. A dispatch unit 218 is provided to decode the instructions and issue the instructions to an appropriate execution unit as illustrated in a central portion of FIGS. 9 and 10. The dispatch unit 218 can provide decoded instructions to one of four types of execution unit illustrated in a middle portion of FIGS. 9 and 10. These four types are the floating point unit 240, the load/store unit 234, the single cycle integer units 228, and the multiple cycle integer unit 224. The units 218, 216, 214, and 212 are all portions of a larger instruction unit 210 which is responsible for providing a continual stream of instructions to one of the many execution units of FIGS. 9 and 10.

Instructions are provided via a 128 bit bus 220 to reservation stations 222, 226, 232, and 238 as illustrated in FIGS. 9 and 10. Each of the reservation stations 222, 226, 232, and 238 feeds one or more execution units 224, 228, 234, and 240. These execution units 224, 228, 234, and 240 will execute the decoded instructions provided by the instruction unit 210. During the execution of instructions, various general purpose registers stored in a General Purpose Register (GPR) File region 230 and various floating point registers stored in a Floating Point Register (FPR) File region 236 may be accessed by the execution units. In addition, the load/store unit 234 can access store queues and finish load queues 244, a D (Data) cache 264 associated with data cache tags 262, and a data cache memory management unit 260. The load/store unit 234 can access this information in order to maintain the integrity of the internal data of the processing unit 200.

A bus interface unit 270 interfaces to the external busses 272 and 274. The bus interface unit 270 places instructions into an I (Instruction) cache 254 associated with instruction tags 252. Data is also read from external memory via the bus interface unit 270 and placed within the D (Data) cache 264. Instructions are also provided as previously discussed via the instruction memory management unit (MMU) 250 to the instruction fetch unit 212. Once the instructions have been provided through the instruction unit and processed appropriately via the execution units 224, 228, 234, and 240, instructions are retired to a completion unit 242. The completion unit 242 compensates for out of order execution and for mispredicted branches and is generally the end of a pipeline prosecution sequence within the processor 200. The 32 bit address bus 272 and the 64 bit data bus 274 are coupled to external memory 280 and computer readable media 286. External memory 280 contains four sets of instructions which are used to perform specific operations within the hardware unit 200. Specifically, memory 280 contains four software program portions 102, 104, 106, and 108 which respectively correspond to the steps 102, 104, 106, and 108 of FIG. 3. Therefore, the CPU 200, by accessing external memory 280, can perform the integer divide operations as taught herein via FIG. 1 through FIG. 7. The software portions 102, 104, 106, 108 stored in memory 280 are typically loaded into memory 280 from computer readable media 286 such as: EPROM, EEPROM, ROM, DRAM, SRAM, magnetic storage, tape storage, optical storage, compact discs (CDs), flash memory storage, network storage, another computer across a communications link, or like storage device for computer executable code, or computer data.

Those skilled in the art will recognize that modifications and variations can be made without departing from the spirit of the invention. Therefore, it is intended that this invention encompass all such variations and modifications as fall within the scope of the appended claims.

What is claimed is:

1. A method for generating an integer quotient of an integer numerator (a) and an integer denominator (b), the method comprising:

providing the integer numerator (a) and the integer denominator (b) along with the integer divide instruction to a Central Processing Unit (CPU);

determining an initial approximation (y) of an inverse of the integer denominator (b) using the central processing unit (CPU);

refining the initial approximation (y) to result in a more accurate approximation (z) of the inverse of the integer denominator (b);

biasing the integer numerator (a) by a bias value (p) to result in a biased numerator (a'); and determining the integer quotient of a/b by multiplying the more accurate approximation (z) by the biased numerator (a') in response to a control signal issued within the CPU and performing rounding operations within the CPU to ensure that the integer quotient of a/b is an integer value.

2. The method of claim 1 wherein the step of providing the integer numerator (a) and the integer denominator (b) comprises:

providing both the integer numerator (a) and the integer denominator (b) in a floating point format which is processable by a floating point unit within the CPU.

3. The method of claim 1 wherein the step of providing the integer numerator (a) and the integer denominator (b) comprises:

providing both the integer numerator (a) and the integer denominator (b) in an integer format where the integer format is converted to a floating point format before being processed by a floating point unit within the CPU.

4. The method of claim 1 wherein the step of determining the integer quotient comprises:

providing the integer quotient in a floating point format which is processable by a floating point unit within the CPU.

5. The method of claim 1 wherein the step of determining the integer quotient comprises:

providing the integer quotient in an integer format.

6. The method of claim 1 wherein the step of determining the integer quotient comprises:

rounding the integer quotient to result in a floor value $\lfloor a/b \rfloor$.

7. The method of claim 1 wherein the step of determining the integer quotient comprises:

rounding the integer quotient to result in a ceiling value $\lceil a/b \rceil$.

8. The method of claim 1 wherein the step of determining an initial approximation (y) comprises:

finding, from a table stored in memory, a fractional part of the initial approximation (y); and computing an exponent part of the initial approximation (y) from an exponent portion of the integer denominator (b).

9. The method of claim 1 wherein the step of determining an initial approximation (y) comprises:

computing the initial approximation (y) as a partial division of 1/b.

10. The method of claim 1 wherein the step of determining an initial approximation (y) comprises:

determining an approximate inverse square root (r) of the integer denominator (b) such that $r \approx (1\sqrt{b})$; and calculating the initial approximation (y) by multiplying the approximate inverse square root (r) by the approximate inverse square root (r) so that $y=r*r$.

11. The method of claim 10 wherein the step of determining an approximate inverse square root (r) comprises:

finding, from a table stored in memory, a fractional part of the approximate inverse square root (r); and computing an exponent part of the approximate inverse square root (r) from an exponent portion of the integer denominator (b).

12. The method of claim 1 wherein the steps of determining an initial approximation (y) of an inverse of the integer denominator (b) and refining the initial approximation (y) to result in a more accurate approximation (z) comprise:

finding the more accurate approximation (z) by accessing a cache using the integer denominator (b) as a cache tag value.

13. The method of claim 1 wherein the step of refining the initial approximation (y) to result in a more accurate approximation (z) comprises:

determining an error value (e) such that $e=1-b*y$; and finding the more accurate approximation (z) wherein $z=f(e, y)$.

14. The method of claim 13 wherein the step of finding the more accurate approximation (z) wherein $z=f(e,y)$ comprises:

using $f(e,y)=y+ey(1+e)(1+e^2)(1+e^4)...(1+e^{2^n})$.

15. The method of claim 13 wherein the step of finding the more accurate approximation (z) wherein $z=f(e,y)$ comprises:

using $f(e,y)=y(1+e)(1+e^2)(1+e^4)...(1+e^{2^n})$.

16. The method of claim 1 wherein the step of refining the initial approximation (y) to result in a more accurate approximation (z) comprises:

determining an error value (e) as a function of the integer denominator (b) and the initial approximation (y) such that $e_0=1-b*y$; and iteratively finding the more accurate approximation (z) wherein each iteration results in a new approximation $z_i$ and a new error term $e_i=1-b*z_i$, each $z_i$ being a more precise approximation to the inverse of the integer denominator (b) and $z_i$ being a function of both $e_{i-1}$ and $z_{i-1}$ so that $z_{i=f(ei-1,zi-1)}$, $z_0$ being equal to y.

17. The method of claim 1 wherein the step of refining the initial approximation (y) to result in a more accurate approximation (z) comprises:

determining the more accurate approximation (z) until z is numerically within 1/(2A+1) from an actual inverse of the integer denominator (1/b), where A is the largest possible numerical absolute value used as the integer numerator (a).

18. The method of claim 1 wherein the step of biasing the integer numerator (a) by a bias value (p) comprises:

finding the biased numerator (a') such that a'=a+p wherein |p| is a fractional value less than 1.0.

19. The method of claim 1 wherein the step of biasing the integer numerator (a) by a bias value (p) comprises:

finding the biased numerator (a') such that a'=a+p wherein p is equal to ±½.

20. The method of claim 1 wherein the step of determining the integer quotient of $\lfloor a/b \rfloor$ comprises:

determining R=M+(a')*z, rounded to zero or −∞, wherein:
M=a rounding integer value;
a'=the biased numerator which is equal to a+p where 0<p<1.0;
z=the more accurate approximation (z); and
determining the integer quotient as R−M.

21. The method of claim 1 wherein the step of determining the integer quotient of $\lceil a/b \rceil$ comprises:

determining R=M+(a')*z, rounded to zero or −∞, wherein:
M=a rounding integer value;
a'=the biased numerator which is equal to −(a−p) where 0 <p<1.0;
z=the more accurate approximation (z); and
determining the integer quotient as M−R.

22. The method of claim 1 wherein the step of determining the integer quotient of $\lfloor a/b \rfloor$ comprises:

determining R=M+(a')*z, rounded to +∞, wherein:
M=a rounding integer value;
a'=the biased numerator which is equal to −(a+p) where 0<p<1.0;
z=the more accurate approximation (z); and
determining the integer quotient as M−R.

23. The method of claim 1 wherein the step of determining the integer quotient of $\lceil a/b \rceil$ comprises:

determining R=M +(a')*z, rounded to +∞, wherein:
M=a rounding integer value;
a'=the biased numerator which is equal to a−p where 0<p<1.0;
z=the more accurate approximation (z); and
determining the integer quotient as R−M.

24. The method of claim 1 wherein the initial approximation (y), the more accurate approximation (z), the biased numerator (a'), and the integer quotient are calculated by performing operations in a floating point portion of the CPU.

25. The method of claim 24 wherein the floating point processor is a pipelined floating point processor.

26. The method of claim 1 wherein the step of refining the initial approximation (y) to result in a more accurate approximation (z) comprises:

determining an error value (e) as a function of b and y such that e=f(b,y); and finding the more accurate approximation (z) as a function of e, b, and y, such that z=g(e,b,y).

27. A method for generating a plurality of integer quotients $a_i/b$ of a corresponding plurality of integer numerators ($a_i$) divided by a common integer denominator (b) utilizing the method in claim 1 for each of the plurality of integer numerators ($a_i$) wherein:

a single more accurate approximation (z) is used in the step of determining the integer quotient of $a_i/b$ for each of the plurality of integer numerators ($a_i$).

28. A plurality of computer instructions implementing the method in claim 1.

29. A computer readable medium containing the plurality of computer instructions claimed in claim 28.

30. A method for generating an integer quotient of an integer numerator (a) and an integer denominator (b), the method comprising:

providing the integer numerator (a) and the integer denominator (b) along with the integer divide instruction to a Central Processing Unit (CPU);

determining an initial approximation (y) of an inverse of the integer denominator (b) using the central processing unit (CPU), wherein this step comprises:

determining an approximate inverse square root (r) of the integer denominator (b) such that $r \approx (1/\sqrt{b})$; and calculating the initial approximation (y) by multiplying the approximate inverse square root (r) by the approximate inverse square root (r) so that y=r*r;

refining the initial approximation (y) to result in a more accurate approximation (z) of the inverse of the integer denominator (b), wherein this step comprises:

determining an error value (e) such that e=1−b*y, and finding the more accurate approximation (z) wherein z=f(e,y);

biasing the integer numerator (a) by a bias value (p) to result in a biased numerator (a'), wherein this step comprises:

finding the biased numerator (a') such that a'=a+p wherein p is equal to ±½; and determining the integer quotient of a/b by multiplying the more accurate approximation (z) by the biased numerator (a') in response to a control signal issued within the CPU and performing rounding operations within the CPU to ensure that the integer quotient of a/b is an integer value.

31. A method for performing integer division in a pipelined floating point processor, the method comprising the steps of:

providing an integer numerator (a) and an integer denominator (b) to the pipelined floating point processor;

determining, via the pipelined floating point processor, an initial approximation (y) of an inverse of the integer denominator (b) such that y≈1/b;

finding, via the pipelined floating point processor, an error value (e) of the initial approximation (y) such that e=1−b*y;

iteratively determining, via at least one iteration within the floating point processor, a more accurate approximation (z) to the inverse of the denominator (b), the iteration being performed until the more accurate approximation (z) is within a specific error tolerance (δ), the more accurate approximation (z) being a function of both the initial approximation (y) and the error value (e);

biasing the integer numerator (a) to a biased numerator (a') wherein a'=±(a+p) wherein |p| is a fractional value less than 1.0 for a floor operation and a'=±(a−p) wherein |p| is a fractional value less than 1.0 for a ceiling operation;

determining a preliminary result by multiplying the integer numerator (a') by the more accurate approximation (z); and rounding the preliminary result to an integer value.

32. An integer divider comprising:

floating point means for determining an initial approximation (y) of an inverse of the integer denominator (b);

floating point means for refining the initial approximation (y) to result in a more accurate approximation (z) of the inverse of the integer denominator (b);

floating point means for biasing the integer numerator (a) by a bias value (p) to result in a biased numerator (a'); and floating point means for determining the integer quotient of a/b by multiplying the more accurate approximation (z) by the biased numerator (a') and performing rounding operations within the CPU to ensure that the integer quotient of a/b is an integer value.

33. The integer divider in claim 32 wherein the floating point means for determining the integer quotient comprises:

floating point means for rounding the integer quotient to result in a floor value $\lfloor a/b \rfloor$.

34. The integer divider in claim 32 wherein the floating point means for determining the integer quotient comprises:

floating point means for rounding the integer quotient to result in a ceiling value $\lceil a/b \rceil$.

35. The integer divider in claim 32 wherein the floating point means for determining an initial approximation (y) comprises:

floating point means for determining an approximate inverse square root (r) of the integer denominator (b) such that $r \approx (1/\sqrt{b})$; and floating point means for calculating the initial approximation (y) by multiplying the approximate inverse square root (r) by the approximate inverse square root (r) so that y=r*r.

36. The integer divider in claim 35 wherein the floating point means for determining an approximate inverse square root (r) comprises:

floating point means for finding a fractional part of the approximate inverse square root (r) from a table stored in memory; and floating point means for computing an exponent part of the approximate inverse square root (r) from an exponent portion of the integer denominator (b).

37. The integer divider in claim 32 wherein the floating point means for determining an initial approximation (y) comprises:

floating point means for finding a fractional part of the initial approximation (y from a table stored in memory); and floating point means for computing an exponent part of the initial approximation (y) from an exponent portion of the integer denominator (b).

38. The integer divider in claim 32 wherein the floating point means determining an initial approximation (y) comprises:

floating point means for computing the initial approximation (y) as a partial division of 1/b.

39. The integer divider in claim 32 wherein the floating point means for determining an initial approximation (y) of an inverse of the integer denominator (b) and refining the initial approximation (y) to result in a more accurate approximation (z) comprises:

floating point means for finding the more accurate approximation (z) by accessing a cache using the integer denominator (b) as a cache tag value.

40. The integer divider in claim 32 wherein the floating point means for refining the initial approximation (y) to result in a more accurate approximation (z) comprises:

floating point means for determining an error value (e) such that e=1−b*y; and floating point means for finding the more accurate approximation (z) wherein z=f(e,y).

41. The integer divider in claim 32 wherein the floating point means for finding the more accurate approximation (z) wherein z=f(e,y) comprises:

floating point means for using:

$$f(e,y)=y+ey(1+e)(1+e^2)(1+e^4)\ldots(1+e^{2^n}).$$

42. The integer divider in claim 32 wherein the floating point means for finding the more accurate approximation (z) wherein z=f(e,y) comprises:

floating point means for using:

$$f(e,y)=y(1+e)(1+e^2)(1+e^4)\ldots(1+e^{2^n}).$$

43. The integer divider in claim 32 wherein the floating point means for biasing the integer numerator (a) by a bias value (p) comprises:

floating point means for finding the biased numerator (a') such that a'=a+p wherein |p| is a fractional value less than 1.0.

44. The integer divider in claim 32 wherein the floating point means for biasing the integer numerator (a) by a bias value (p) comprises:

floating point means for finding the biased numerator (a') such that a'=a+p wherein p is equal to ±½.

45. Integer divider software stored on computer readable media, the computer readable media comprising:

at least one computer instruction for determining an initial approximation (y) of an inverse of the integer denominator (b);

at least one computer instruction for refining the initial approximation (y) to result in a more accurate approximation (z) of the inverse of the integer denominator (b);

at least one computer instruction for biasing the integer numerator (a) by a bias value (p) to result in a biased numerator (a'); and at least one computer instruction for determining the integer quotient of a/b by multiplying the more accurate approximation (z) by the biased numerator (a') and performing rounding operations within the CPU to ensure that the integer quotient of a/b is an integer value.

46. The integer divider software in claim 45 wherein the at least one computer instruction for determining the integer quotient comprises:

at least one computer instruction for rounding the integer quotient to result in a floor value $\lfloor a/b \rfloor$.

47. The integer divider software in claim 45 wherein the at least one computer instruction for determining the integer quotient comprises:

at least one computer instruction for rounding the integer quotient to result in a ceiling value $\lceil a/b \rceil$.

48. The integer divider software in claim 45 wherein the at least one computer instruction for determining an initial approximation (y) comprises:

at least one computer instruction for finding. . a fractional part of the initial approximation (y) from a table stored in memory; and at least one computer instruction for computing an exponent part of the initial approximation (y) from an exponent portion of the integer denominator (b).

49. The integer divider software in claim 45 wherein the at least one computer instruction for determining an initial approximation (y) comprises:

at least one computer instruction for computing the initial approximation (y) as a partial division of 1/b.

50. The integer divider software in claim 45 wherein the at least one computer instruction for determining an initial approximation (y) comprises:

at least one computer instruction for determining an approximate inverse square root (r) of the integer denominator (b) such that $r \approx (1\sqrt{b})$; and at least one computer instruction for calculating the initial approximation (y) by multiplying the approximate inverse square root (r) by the approximate inverse square root (r) so that y=r*r.

51. The integer divider software in claim 50 wherein the at least one computer instruction for determining an approximate inverse square root (r) comprises:

at least one computer instruction for finding, from a table stored in memory. a fractional part of the approximate inverse square root (r); and at least one computer instruction for computing an exponent part of the approximate inverse square root (r) from an exponent portion of the integer denominator (b).

52. The integer divider software in claim 45 wherein the at least one computer instruction for determining an initial approximation (y) of an inverse of the integer denominator (b) and refining the initial approximation (y) to result in a more accurate approximation (z) comprises:

at least one computer instruction for finding the more accurate approximation (z) by accessing a cache using the integer denominator (b) as a cache tag value.

53. The integer divider software in claim 45 wherein the at least one computer instruction for refining the initial approximation (y) to result in a more accurate approximation (z) comprises:

at least one computer instruction floating point means for determining an error value (e) such that e=1−b*y; and at least one computer instruction floating point means for finding the more accurate approximation (z) wherein z=f(e,y).

54. The integer divider software in claim 45 wherein the at least one computer instruction for finding the more accurate approximation (z) wherein z=f(e,y) comprises:

at least one computer instruction for calculating:

$$f(e,y)=y+ey(1+e)(1+e^2)(1+e^4)\ldots(1+e^{2^n}).$$

55. The integer divider software in claim 45 wherein the at least one computer instruction for finding the more accurate approximation (z) wherein z=f(e,y) comprises:

at least one computer instruction for calculating:

$$f(e,y)=y(1e)(1+e^2)(1+e^4)\ldots(1+e^{2^n}).$$

56. The integer divider software in claim 45 wherein the at least one computer instruction for biasing the integer numerator (a) by a bias value (p) comprises:

at least one computer instruction for finding the biased numerator (a') such that a'=a+p wherein |p| is a fractional value less than 1.0.

57. An apparatus for generating an integer quotient of an integer numerator (a) and an integer denominator (b), the apparatus comprising:

a central processing unit (CPU) comprising pipelined floating point mathematical circuitry;

memory coupled to the central processing unit (CPU) which contains one or more computer instructions. the one or more computer instructions being accessed by the CPU and decoded to perform the following operations:

determining an initial approximation (y) of an inverse of the integer denominator (b) using the pipelined floating point mathematical circuitry;

refining the initial approximation (y) to result in a more accurate approximation (z) of the inverse of the integer denominator (b) using the pipelined floating point mathematical circuitry;

biasing the integer numerator (a) by a bias value (p) to result in a biased numerator (a') using the pipelined floating point mathematical circuitry; and determining the integer quotient of a/b by multiplying the more accurate approximation (z) by the biased numerator (a') in response to a control signal issued within the CPU and performing rounding operations within the CPU to ensure that the integer quotient of a/b is an integer value using the pipelined floating point mathematical circuitry.

* * * * *